June 3, 1941.   R. E. WISSMAN   2,244,037
SLIDING KEY CLUTCH
Filed Dec. 4, 1939   2 Sheets-Sheet 1
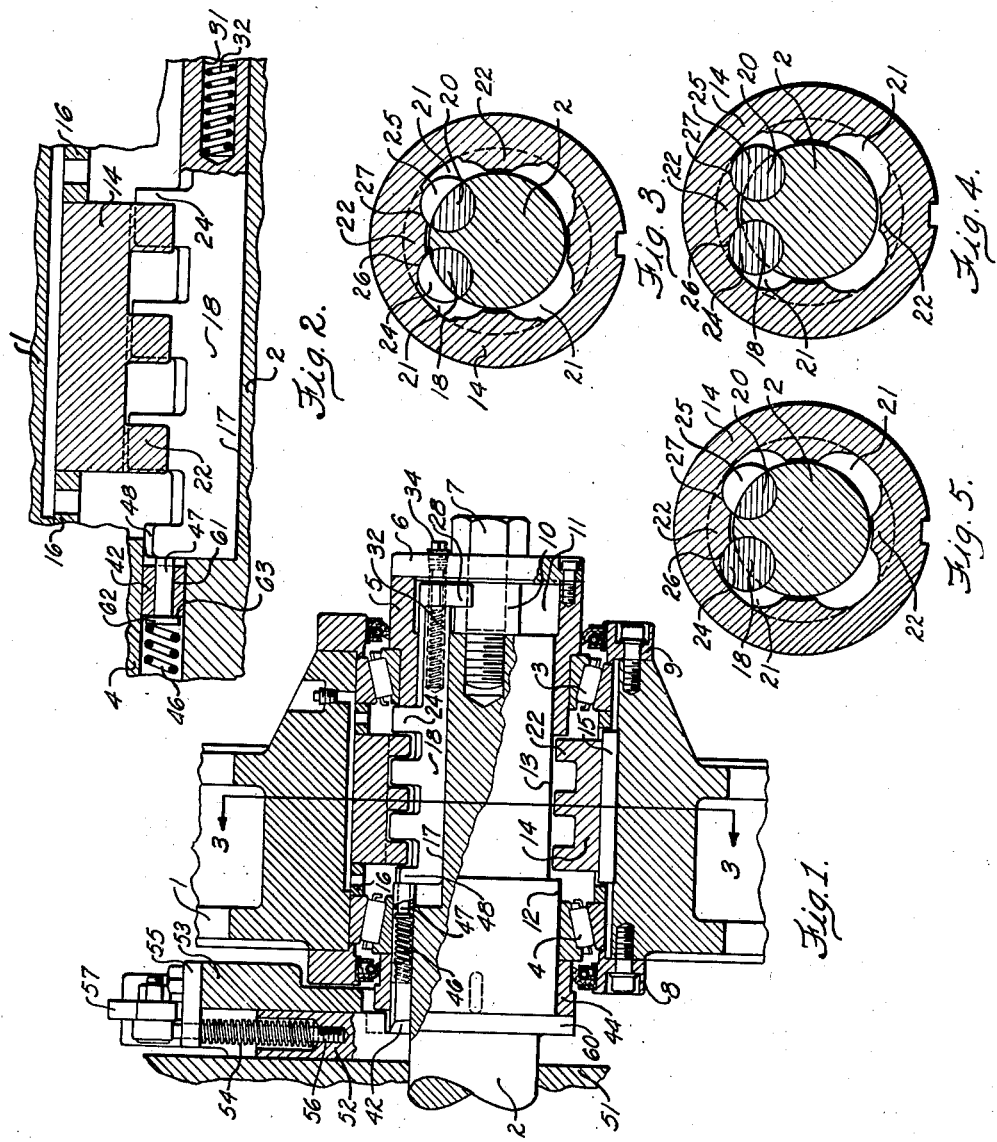
INVENTOR.
REUBEN E. WISSMAN
BY
ATTORNEYS.

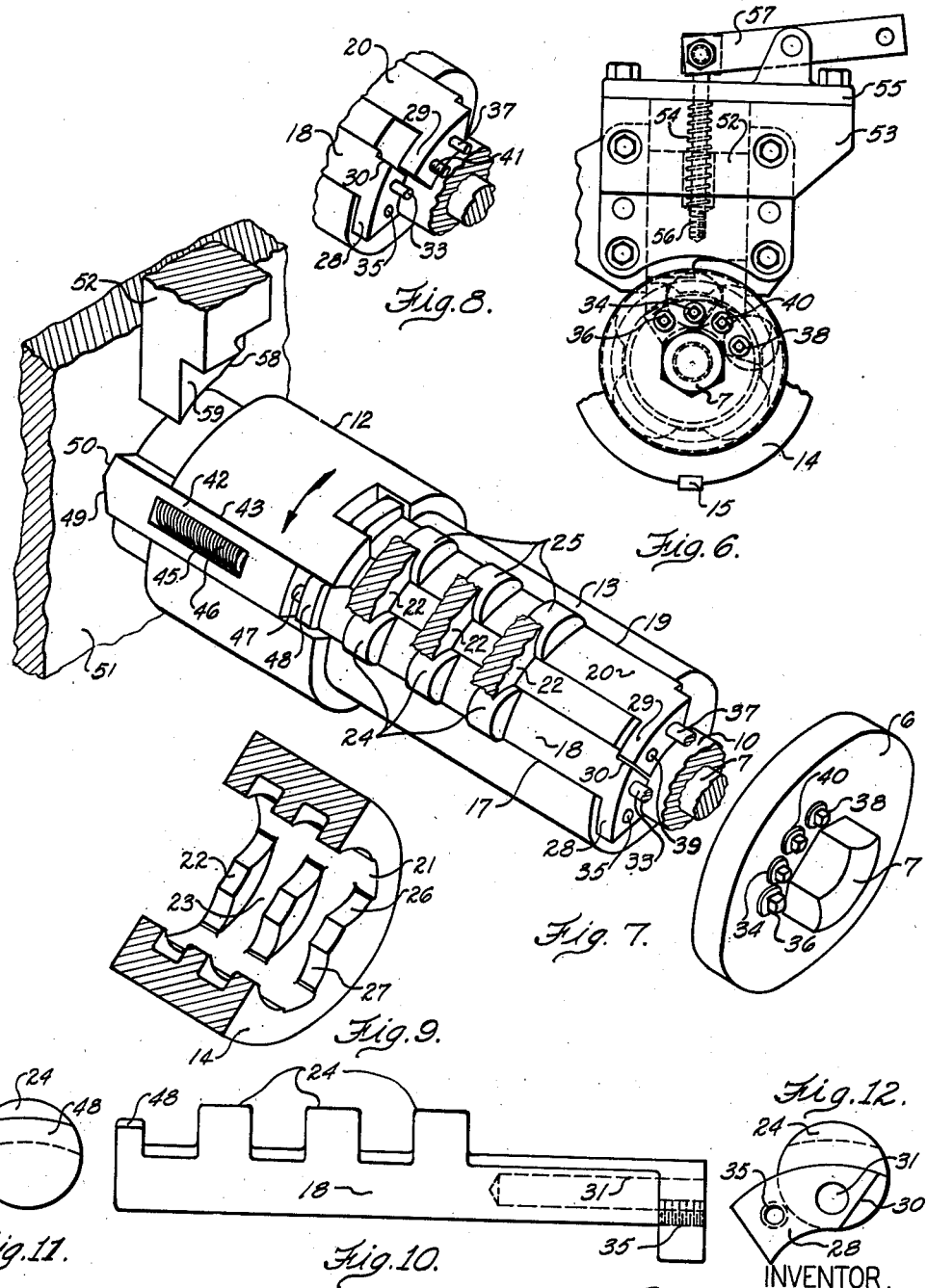

Patented June 3, 1941

2,244,037

UNITED STATES PATENT OFFICE 2,244,037

SLIDING KEY CLUTCH

Reuben E. Wissman, Minster, Ohio, assignor to The Minster Machine Company, Minster, Ohio, a corporation of Ohio Application December 4, 1939, Serial No. 307,442

23 Claims. (Cl. 192—24)

This invention relates to a sliding key clutch and more particularly to such a clutch which is especially adapted to be used in conjunction with a metal working press or the like. The present invention provides a number of improvements over the key clutches which have heretofore been available.

The principal object of the present invention is to provide a key clutch which is stronger and sturdier and which provides greater efficiency of operation than key clutches heretofore devised; with the clutch of the present invention, wear of the working parts is reduced to a minimum by a number of novel features and an improved operation results; at the same time the present invention provides a key clutch in which the peripheral speed of the clutching parts is kept at a minimum by locating them near the center of the driven shaft, wherein the clutch when engaged positively locks the driving member and the driven member against relative rotation in either direction, thus preventing "spring-back" or "kick-back," and wherein provision is made for "bumping" by the holding inoperative of the locking key, and wherein both the locking key and the main key may be retracted so as to allow the operator to work on the press with safety; the present invention also provides a relatively wide opening into which the driving teeth of the main key may be moved before being struck by the driving surface, thereby preventing wear on the corners of the driving teeth of the driving key and on the cooperating teeth carried by the driving member.

Another object is to provide for the rapid retraction of the driving key at the point of disengagement, as by spring-loading it, whereby injury or wear of the corners of the engaging teeth on the driving member and on the driving key is prevented.

Another object is to provide a key clutch wherein stronger surfaces are made available; and wherein "bumping" in either direction may be accomplished.

Still other objects will more fully hereinafter appear.

In the accompanying drawings:

Figure 1 is a vertical longitudinal section through a portion of a press equipped with a clutch embodying the principles of the present invention; this figure shows the clutch in the unlocked position in which the flywheel rotates freely about the driven shaft. Only sufficient of the press mechanism is illustrated to make clear the operation.

Figure 2 is a detailed view similar to Figure 1 of a portion of the mechanism shown in Figure 1, with the clutch engaged.

Figure 3 is a transverse vertical section taken approximately on the line 3—3 of Figure 1 and showing the mechanism in disengaged position.

Figure 4 is a view similar to Figure 3 but showing the clutch in its normally engaged position.

Figure 5 is a similar view showing the clutch in "bumping" position.

Figure 6 is a fragmentary end elevation taken from the right hand end of Figure 1.

Figure 7 is a somewhat simplified perspective view showing the keys on the driven shaft and showing one set of teeth on the driven member.

Figure 8 is a fragmentary perspective view of the mechanism shown in Figure 7, with the locking key held disengaged, whereby the clutch is adapted for "bumping."

Figure 9 is a sectional perspective view showing the interior of the driving member known as the driving block which is fixedly carried on the inside of the driving flywheel, and shows the disposition of the teeth thereupon, which teeth are adapted to engage the teeth on the keys and to thereby effect driving connection to the driven shaft.

Figure 10 is an enlarged side elevation of one of the keys.

Figure 11 is a left hand elevation of the key of Figure 10.

Figure 12 is a right hand elevation of the key of Figure 10.

General construction

In general the clutch illustrated in the drawings is adapted to be used for interconnecting a flywheel which is driven by a source of power (not illustrated), this flywheel constituting the driving member with a driven shaft surrounded by the flywheel. The driven shaft is connected to any suitable portion of the press with which the mechanism is employed. The flywheel is journaled upon the driven shaft by suitable bearings which are adapted to allow the flywheel to rotate freely thereabout when the clutch is in disengaged position. Fixedly carried on the inner periphery of the flywheel are a plurality of longitudinally spaced teeth. Longitudinally slidably mounted on the periphery of the driven shaft is a main key which is provided on its outer surface with spaced teeth which are adapted to be freely received between the teeth on the flywheel whereby the flywheel can rotate freely when the clutch is disengaged. Suitable means is provided for manual or pedal control of the longitudinal disposition of the main key when it is desired to effect driving of the driven shaft, this main key being moved forwardly under spring-loading so as to place its teeth transversely beside the teeth of the flywheel which drivingly engage the same as the flywheel continues to rotate. Immediately when the teeth of the flywheel drivingly engage the teeth of the main key and commence rotation of the driven shaft, a secondary key is moved longitudinally so as to lock the driving member to the driven shaft against relative rotation in either direction.

When it is desired to effect disengagement of the flywheel from the driven shaft, which may be carried out automatically at the expiration of one revolution of the driven shaft, cam means retracts the main key, moving this main key relatively slowly until it is almost out of engagement with the teeth of the flywheel and then under spring-loading kicking it rapidly out of engagement, the main key carrying the locking key with it.

*Detailed construction*

Referring to the drawings in detail, reference numeral 1 designates a flywheel which is driven by suitable means (not shown) and which is the driving member herein. Reference numeral 2 designates the driven shaft which is connected to the eccentric of a metal working press or the like. Flywheel 1 is journaled so as to be capable of freely rotating about shaft 2 when the clutch is disengaged, this journaling being accomplished by means of tapered roller bearings 3 and 4, of which bearing 3 is mounted upon a journal member 5 which is fixedly carried on the outer end of shaft 2 in any suitable manner, journal member 5 being provided with a coverplate 6 which is held in place by means of cap screw 7 extending therethrough and into the end of shaft 2. End plates 8 and 9 are fixedly carried by the flywheel 1 around shaft 2 and journal member 5. A spacer 10 is provided on cap screw 7 to hold end plate 6 at a suitable distance from the end of shaft 2, forming an annular space 11 which serves to accommodate the ends of the main and locking keys in a manner which will presently appear. Bearing 4 is mounted upon an enlarged portion 12 of shaft 2 and is held at the proper position on shaft portion 12 by the spacer 44 which engages integral flange 60 of shaft 2.

Surrounding the reduced end portion 13 of shaft 2 is an annular driving block 14 which is fixedly carried on the inner periphery of flywheel 1, being keyed thereto by key 15. This driving block is positioned between the bearings 3 and 4 by means of the bearing spacers 16, these spacers being recessed so as to accommodate and be held against rotation by means of key 15.

A main keyway 17 is cut longitudinally in the surface of shaft portion 13, this keyway extending forwardly into the enlarged shaft portion 12. Slidably mounted in this keyway 17 is a main clutch key 18. Disposed parallel to keyway 17 is a similar keyway 19 which accommodates the slidable locking key 20 which is exactly like main key 18 so as to be interchangeable therewith upon wear occurring but which performs an entirely different function as will presently appear.

Driving block 14 is formed on its inner periphery with four equally spaced and identical longitudinal recesses 21 between which are the integral inwardly extending driving teeth 22, these teeth being spaced longitudinally and being disposed in parallel transverse planes. Teeth 22 are separated longitudinally by the spaces 23.

Driving key 18 and locking key 20 are formed with their main portion flush with the surface of shaft portion 13. Integrally formed on keys 18 and 20 are a plurality of longitudinally spaced upstanding teeth, these teeth being designated as 24 on key 18 and as 25 on key 20 to aid in the description although it will be understood that keys 18 and 20 are identical as set forth above. The teeth 22 on driving block 14 are formed with arcuate side surfaces 26 and 27 for engaging tightly the corresponding arcuate surfaces of the upstanding teeth 24 and 25 as will be clearly apparent from Figures 3 to 5 and 7 of the drawings, the arcuate surfaces 26 serving as the driving surfaces and arcuate portions 27 serving for locking. Surfaces 26 and 27 both act in "bumping," depending upon in which direction "bumping" is carried out. The recesses 21 between the teeth 22 are elongated peripherally so as to be considerably larger in cross-section than teeth 24 and 25. This will also be apparent from Figures 3 to 5.

Integrally formed on the ends of keys 18 and 20 are ears 28 and 29, respectively, which extend around the end of shaft portion 13 in the direction of driving rotation and which are accommodated in the space 11 previously referred to. Key 18 is stepped as at 30 to receive a portion of the ear 29 and key 20 is similarly stepped, not for any operative purpose but solely to enable its interchange with key 18 upon the occurrence of wear. The purpose of this step 30 is to insure that key 20 is carried by key 18 upon retraction of key 18 from engagement with teeth 22 and that key 20 is unable to move forwardly into engagement with arcuate surfaces 27 ahead of key 18. Key 18 is provided with a longitudinal bore 31 extending from its rearward end and in this bore 31 a compression spring 32 is disposed, this spring 32 being held in place and being compressed upon retraction of key 18 upon pin 33 which is integral with a plug 34 screw-threadedly received in coverplate 6 and accessible from outside thereof. Ear 28 is provided with a screw-threaded bore 35 opposite a plug 36 in coverplate 6. For holding key 18 and consequently key 20 in retracted position, plug 36 may be removed and a suitable screw-threaded bolt extended into engagement with the bore 35, whereupon upon turning such a bolt, its head will bear against coverplate 6 and will draw the keys into their retracted position. This is done when it is desired to positively insure against the establishment of driving connection between flywheel 1 and shaft 2, even though the pedal of the press be manipulated so as to normally cause the key clutch to establish such driving connection. This is merely a safety measure to be used when working on the dies of the press.

Key 20 has a bore corresponding to bore 31 and containing a similar spring which is likewise held in place and compressed by a pin 37, pin 37 being integral with a plug 38 in coverplate 6. The key 20 likewise has its ear 29 provided with a screw threaded bore 39. When it is desired to hold key 20 in retracted position, as for "bumping," the plug 40 in coverplate 6 is removed and a screw-threaded bolt 41 (Figure 8) is inserted and screwed into the bore 39, thereby retracting key 20. The springs carried in the bores at the rearward ends of keys 18 and 20 serve to urge these keys forwardly into the position where they are engaged by the teeth 22 of the driving block 14. The control of keys 18 and 20 is effected by a longitudinally slidable throw-out key 42, this key 42 operating within a keyway 43 provided therefor in the surface of the enlarged portion 12 of shaft 2 below bearing 4 and sleeve 44 and extending through shoulder 60, this keyway 43 being in alignment with keyway 17 for key 18. A recess 45 is provided lengthwise of throw-out key 42 and in this recess compression spring 46 which is adapted to urge a slidable pin 47 rightwardly of Fig. 1 through a bore 61 into engagement with an upstanding ear 48 on key 18 until the head 62 of pin 47 engages the rear end 63 of the recess 45. The forward end of throw-out key 42 is beveled as at 49 and is blunt at 50. When the key 18 is spring pressed forwardly by its spring 32, the blunt end 50 of throw-out key 42 is pushed into sliding engagement with frame member 51.

In order to retract keys 18 and 19 and to thereby disengage the clutch, a clutch throw-out member 52 is provided, this member 52 being vertically slidable in a bracket 53 (Figs. 1 and 6). Clutch throw-out member 52 is adapted to be normally pressed downwardly into engagement with shaft 2 by means of a compression spring 54 which abuts against a coverplate 55 which is fixedly mounted above bracket 53. Spring 54 surrounds a clutch operating rod 56 which is screw-threadedly received in clutch operating member 52 and is linked to a pivoted tripping lever 57 which is connected in any suitable manner to a pedal or manual means for operating the clutch. Clutch operating member 52 is provided at its lower end with a beveled surface 58 adapted to cooperate with beveled surface 49 of throw-out key 42 and with a straight portion 59 adapted to cooperate with the blunt portion 50 of key 42. Thus, in the normal position shown in Figure 1, member 52 is down, blunt end 50 is in contact with flat portion 59 and throw-out key 42 is thus in a rightward position and holds the keys 18 and 20 in their retracted position. If member 52 is pulled upwardly for an instant by suitable manipulation of lever 57 and then allowed to return downwardly, key 42 will move forwardly, engaging the clutch and causing the shaft 2 to rotate until key 42 is moved rearwardly by its engagement with member 52 upon the completion of a single revolution of shaft 2. Likewise, if member 52 is held upwardly, the shaft 2 will rotate continuously until member 52 is released downwardly, whereupon shaft 2 will stop upon the completion of the revolution in which it is then engaged, by reason of the disengagement of the clutch.

Operation

While the operation will be in large part obvious from the foregoing description, it is desirable to summarize the operation at this point.

With flywheel 1 rotating continuously in the direction of the arrow on Fig. 7 (counterclockwise of Figs. 3 to 5) and with the clutch in the disengaged position of Figs. 1 and 3, spring 32 in bore 31 of driving key 18 and the corresponding spring in locking key 20 is compressed by reason of the bearing of the rear end of throw-out key 42 against the tooth 48 on the forward end of driving key 18, keys 18 and 20 being retracted. The spring 46 in throw-out key 42 is compressed because the rear end of the pin 47 is flush with the rear end of throw-out key 42, there being no clearance between the key 18 and the throw-out key 42. If now member 52 be elevated, springs 32 and 46 will expand, spring 46 expanding until head 62 of pin 47 engages end 63 of recess 45 causing throw-out key 42 to move partially towards frame member 51 and causing clearance to exist between the rear end of throw-out key 42 and tooth 48 of driving key 18. Spring 32 will simultaneously expand moving the driving key 18 and with it the throw-out key 42 until the teeth 24 are in sliding engagement with the sides of a row of teeth on driving block 14. At the same time, locking key 20 will be moved forwardly by its spring into similar sliding engagement with teeth 22 or as far as it is allowed by step 30 and ear 29. As driving block 14 continues its rotation, the teeth 24 will come opposite a recess 21 whereupon key 18 will be moved forwardly under the action of its spring 32 and its teeth 24 will slide longitudinally forward in the recess 21 to a position where they are transversely in line with teeth 22. At the same time, throw-out key 42 will move forward until it slidingly engages frame member 51. As the driving block 14 continues in its rotation, the teeth 24 will next come into driving engagement with the driving arcuate walls 26 of teeth 22 and immediately upon this happening, the teeth 25 of key 20 will come opposite the next adjacent recess 21, whereupon they will be received behind the locking arcuate surfaces 27 of the teeth 22, locking key 20 being moved forward by its spring. The parts are now in the position of Figs. 2 and 4. The driven shaft 2 will now rotate with flywheel 1 and is prevented from relative rotation in either direction with respect thereto. By reason of the fact that recesses 21 in driving block 14 are considerably longer than teeth 24, teeth 24 have ample opportunity to be received in the recess, and because of this and the fact that key 18 is spring-loaded by spring 32 and therefore moves forwardly rapidly, the engaging edges therefore are not chipped or injured during the clutch engaging action.

With the driving connection thus established, assume that it is desired to declutch the mechanism. This may take place either automatically after one revolution of shaft 2 by reason of the restoration of member 52 to its downward position immediately after engagement of the clutch, or it may take place after the desired number of revolutions of the shaft 2. Member 52 is allowed to return to its normal position whereupon when throw-out key 42 comes around it is pushed rearwardly by member 52. As throw-out key 42 moves rearwardly, its rear end first engages the tooth 48 on main key 18, spring 46 being compressed as this happens between head 62 of pin 47 and the forward end of recess 45. Thereupon main key 18 moves rearwardly relatively slowly until it is nearly disengaged, whereupon the frictional engagement between teeth 24 and teeth 22 is lowered to a marked extent whereupon spring 46 will exert a force sufficient to kick pin 47 and key 18 very rapidly to the fully retracted position, thereby preventing injury to or chipping of the corners of teeth 24 and 22 during disengagement. This action of spring 46 will be stopped by head 62 of pin 47 engaging end 63 of recess 45. Thereupon, throw-out key 42 will continue rearwardly until its rear end contacts the tooth 48 of key 18 whereupon it may carry key 18 still further rearwardly if it is not already in fully retracted position until the end 28 comes in contact with the forward face of coverplate 6 or until blunt end 50 of throw-out key 42 is in full engagement with flat surface 59 of member 52. As key 18 is moved into its retracted position in this manner, key 20 is simultaneously moved by reason of its ear 29 being carried by the step 30 on the end of key 18.

Should it be desired to effect "bumping," plug 40 will be removed and bolt 37 inserted as in Fig. 8, holding locking key 20 in retracted position. Clutch operating member 52 will then be moved upwardly, allowing key 18 to enter a recess 21 in driving block 14, as in Fig. 5. Then, by manually rotating flywheel 1 in the desired direction, "bumping" may be readily accomplished. This "bumping" may be in either direction, as will be obvious from a consideration of Fig. 5. It is frequently desirable to "bump" in both directions.

If it is desired to positively prevent engagement of the clutch, both the main key and the locking key may be retracted by removing plug 36 and inserting a bolt similar to bolt 37 in the recess 35 of key 18. Thus, key 18 will be held retracted and with it key 20 and driving of shaft 2 will be prevented even though the operating pedal should be accidentally pressed.

From the foregoing, it will be seen that the present invention provides a stronger assembly, an assembly which is longer lived and an assembly which allows more efficient and economical operation. If it is desired to compensate for wear of keys 18 and 20, because this wear occurs on their adjacent faces, these keys may be removed readily and interchanged, whereupon their worn surfaces are inoperative except in "bumping" and fresh, unworn surfaces are presented to the teeth 22. The assembly prevents kickback by reason of the utilization of locking key 20. Because engaging teeth 24 and 22 are located close to the central axis of shaft 2, wear is minimized by reason of the low peripheral speed at this point. It will further be seen that the mechanism of the present invention is capable of having either the locking key or the locking key and the driving key held disengaged. The mechanism further allows bumping in either direction and by reason of the strength of teeth 24 and the large area presented thereby wear during bumping is minimized. Likewise, by reason of the spring-loading of the keys during both engagement and disengagement which insures a rapid passage of the adjacent corners of the teeth at a time when they would otherwise be subjected to injury, wear is further reduced. Furthermore, by reason of the provision of the relatively long recesses 21, reception of teeth 24 therewith is insured whereas if recesses 21 were short and the flywheel were revolving at high speed, such reception might not be accomplished and failure to engage, coupled with excessive wear would be the result, this very act of providing the long recesses 21 in itself preventing wear of the engaging corners. Wear is further reduced and effectiveness further increased by the use of longitudinally slidable keys which move longitudinally into and out of engagement instead of rotating. The independent main key 18 always slips into engagement first, entering on that side of the opening or recess 21 which is opposite the driving side of the recess, and is therefore well into engaging position before the driving side 26 catches up with it and the lost-motion or locking key 20 slides into engagement.

I wish it to be understood that I intend to include as within the invention such modifications thereof as may be necessary to adapt it to varying conditions and uses and as fall within the scope of the appended claims.

Having thus fully described my invention, what I claim as new and desire to secure by Letters Patent is:

1. A clutch comprising a rotating driving member, a rotatable driven member coaxial therewith, one of said members surrounding the other, said members having extended closely adjacent longitudinal surfaces, a projection fixedly carried on one of said members and extending from its longitudinal surface towards the other of said members, a longitudinally slidable key mounted in the longitudinal surface of the other of said members, a projection fixedly carried on said key and extending therefrom towards the first-named member, said key projection being adapted when said key is in one position of longitudinal adjustment with its projection transversely in line with said first-named projection to drivingly engage said first-named projection, said first-named member being so formed longitudinally adjacent its said projection as to allow free passage of said key projection by its said projection when said key is in a retracted position of longitudinal adjustment, whereby when said key is in said first-named position of longitudinal adjustment driving engagement between said driving and driven members is effected and when said key is in said second-named position of longitudinal adjustment, said driving member can idly revolve with respect to said driven member without driving said driven member, spring means for normally urging said key into the first-named position where its projection is in driving engagement with said first-named projection, clutch throw-out means including a cam for retracting said key to the second-named position where its projection freely passes by said first-named projection, and a plunger associated with said throw-out means which is spring-loaded during operation of said throw-out means to retract said key for rapidly kicking the key out of driving engagement with the first-named projection, said cam means retracting said key relatively slowly during the first and major portion of the disengagement and said plunger retracting said key rapidly during the final portion of the disengagement, thereby reducing wear and injury to the engaging portions of said projections.

2. A clutch comprising a rotating driving member, a rotatable driven member coaxial therewith, one of said members surrounding the other, said members having extended closely adjacent longitudinal surfaces, a longitudinal recess in said longitudinal surface of one of said members, a longitudinally slidable key mounted in said longitudinal surface of the other of said members, and a projection fixedly carried on said key and extending therefrom towards the first-named member, said key projection being adapted to enter said recess and having engagement surfaces to drivingly engage alternatively matching surfaces on the sides of said recess when the key is in one position of longitudinal adjustment, said recess being peripherally longer than said key projection whereby said key projection is more readily received in said recess and whereby manual "bumping" of the driving member against the driven member in either direction may be accomplished.

3. A clutch comprising a rotating driving member, a rotatable driven member co-axial therewith, one of said members surrounding the other, said members having extended closely adjacent longitudinal surfaces, a plurality of parallel longitudinal recesses in said longitudinal surface of one of said members, two of said recesses forming between their sides a projection extending towards the other of said members, a longitudinally slidable main key mounted in the longitudinal surface of the other of said members, a projection fixedly carried on said main key and extending therefrom towards the first-named member, said main key projection being adapted to enter one of said recesses and to drivingly engage said projection on said first-named member, a longitudinally slidable locking key mounted in the longitudinal surface of the second-named member parallel to said main key, a projection fixedly carried on said locking key and extending therefrom towards said first-named member, and means rendering said locking key dependent upon said main key in one longitudinal direction and independent thereof in the other longitudinal direction, said locking key projection being adapted to enter a parallel recess in locking engagement with the side thereof after said main key has entered one of said recesses and has entered into driving engagement with said projection on said first-named member, whereby said driving member and said driven member are locked against relative motion in either direction after engagement of said main key projection has been effected.

4. A clutch comprising a rotating driving member, a rotatable driven member co-axial therewith, one of said members surrounding the other, said members having extended closely adjacent longitudinal surfaces, a plurality of parallel longitudinal recesses in said longitudinal surface of one of said members, two of said recesses forming between their sides a projection extending towards the other of said members, a longitudinally slidable main key mounted in the longitudinal surface of the other of said members, a projection fixedly carried on said main key and extending therefrom towards the first-named member, said main key projection being adapted to enter one of said recesses and to drivingly engage said projection on said first-named member, a longitudinally slidable locking key mounted in the longitudinal surface of the second-named member parallel to said main key, a projection fixedly carried on said locking key and extending therefrom towards said first-named member, means rendering said locking key dependent upon said main key in one longitudinal direction and independent thereof in the other longitudinal direction, said locking key projection being adapted to enter a parallel recess in locking engagement with the side thereof after said main key has entered one of said recesses and has entered into driving engagement with said projection on said first-named member, whereby said driving member and said driven member are locked against relative motion in either direction after engagement of said main key projection has been effected, and spring means independently urging said keys into driving and locked engagement.

5. A clutch comprising a rotating driving member, a rotatable driven member co-axial therewith, one of said members surrounding the other, said members having extended closely adjacent longitudinal surfaces, a plurality of parallel longitudinal recesses in said longitudinal surface of one of said members, two of said recesses forming between their sides a projection extending towards the other of said members, a longitudinally slidable main key mounted in the longitudinal surface of the other of said members, a projection fixedly carried on said main key and extending therefrom towards the first-named member, said main key projection being adapted to enter one of said recesses and to drivingly engage said projection on said first-named member, a longitudinally slidable locking key mounted in the longitudinal surface of the second-named member parallel to said main key, a projection fixedly carried on said locking key and extending therefrom towards said first-named member, means rendering said locking key dependent upon said main key in one longitudinal direction and independent thereof in the other longitudinal direction, said locking key projection being adapted to enter a parallel recess in locking engagement with the side thereof after said main key has entered one of said recesses and has entered into driving engagement with said projection on said first-named member, whereby said driving member and said driven member are locked against relative motion in either direction after engagement of said main key projection has been effected, and means for alternatively holding said locking key and said locking and main keys in disengaged position.

6. A clutch unit comprising a shaft, a toothed sleeve surrounding said shaft and having teeth longitudinally and peripherally spaced on its surface which is adjacent said shaft, a longitudinally slidable key slidably mounted in said shaft and having longitudinally spaced teeth adapted to engage said sleeve teeth on the sides thereof, a plunger slidably mounted in said shaft for actuating said key longitudinally to lock and unlock it from said sleeve teeth, means for actuating said plunger, and means operatively associated with said plunger for rapidly actuating said key.

7. A clutch unit comprising a shaft, a toothed sleeve surrounding said shaft and having teeth longitudinally and peripherally spaced on its surface which is adjacent said shaft, a longitudinally slidable key slidably mounted in said shaft and having longitudinally spaced teeth adapted to engage said sleeve teeth on the sides thereof, a plunger slidably mounted in said shaft for actuating said key longitudinally to unlock it from said sleeve teeth, means located interiorly of said key for normally urging said key into the position where its teeth are adapted to drivingly engage said teeth on said sleeve, and spring means located interiorly of said plunger and loaded by movement thereof to urge said key out of driving engagement with said sleeve teeth.

8. A clutch comprising a shaft, a flywheel journaled on said shaft, means fixedly carried by said flywheel on its inner peripheral surface adjacent said shaft and fixedly carrying longitudinally and peripherally spaced teeth, and a plurality of longitudinally slidable keys slidably mounted in said shaft, said keys carrying teeth which are adapted to engage opposite sides of said teeth carried by said flywheel to lock the same therebetween.

9. A clutch comprising a shaft, a flywheel journaled on said shaft, means fixedly carried by said flywheel on its inner peripheral surface adjacent said shaft and fixedly carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys to substantially simultaneously unlock them from said teeth carried by said flywheel.

10. A clutch comprising a shaft, a flywheel encircling the same, said flywheel fixedly carrying on its surface adjacent said shaft a plurality of longitudinally and peripherally spaced teeth, a longitudinally slidable key slidably mounted in the surface of said shaft and adapted to be received between longitudinal rows of said teeth, said key having longitudinally spaced teeth thereon adapted in one position of longitudinal adjustment of said key to be received transversely between said teeth carried on said flywheel and in another position of longitudinal adjustment of said key to drivingly engage said teeth carried by said flywheel in transverse alignment therewith, and spring-loading means for rapidly moving said key from either of said positions of longitudinal adjustment to the other of said positions of longitudinal adjustment.

11. A clutch comprising a shaft, a flywheel encircling the same, said flywheel fixedly carrying on its surface adjacent said shaft a plurality of longitudinally and peripherally spaced teeth, a longitudinally slidable driving key slidably mounted in the surface of said shaft and adapted to be received between longitudinal rows of said teeth, a longitudinally slidable locking key slidably mounted in the surface of said shaft and adapted to be received between longitudinal rows of said teeth, said keys having longitudinally spaced teeth thereon adapted in one position of longitudinal adjustment of said keys to be received transversely between said teeth carried on said flywheel and in another position of longitudinal adjustment of said keys to engage said flywheel teeth in transverse alignment therewith to fixedly position said flywheel with respect said driven shaft to prevent back-lash thereof.

12. A clutch comprising a shaft, a flywheel encircling the same, said flywheel fixedly carrying on its surface adjacent said shaft a plurality of longitudinally and peripherally spaced teeth, a longitudinally slidable driving key slidably mounted in the surface of said shaft and adapted to be received between longitudinal rows of said teeth, a longitudinally slidable locking key slidably mounted in the surface of said shaft and adapted to be received between longitudinal rows of said teeth, said keys having longitudinally spaced teeth thereon adapted in one position of longitudinal adjustment of said keys to be received transversely between said teeth carried on said flywheel and in another position of longitudinal adjustment of said keys to engage said flywheel teeth in transverse alignment therewith to fixedly position said flywheel with respect said driven shaft to prevent back-lash thereof, and spring-loading means for rapidly moving said key from either of said positions of longitudinal adjustment to the other of said positions of longitudinal adjustment.

13. A clutch comprising a shaft, a flywheel surrounding said shaft and journaled thereabout, said flywheel carrying a plurality of transversely aligned teeth extending inwardly toward the periphery of said shaft, a longitudinally slidable key slidably mounted in the surface of said shaft, said key having an outwardly extending tooth fixedly carried thereupon, the space between said teeth on said flywheel being peripherally greater than the peripheral extent of said tooth on said key whereby said space freely accommodates said tooth on said key when in transverse alignment between adjacent peripherally spaced flywheel teeth, said key tooth alternately engaging adjacent flywheel teeth upon alternate rotation of said flywheel to accomplish manual "bumping" of the driving member against the driven member in either direction when said key is in one position of longitudinal adjustment.

14. A clutch comprising a shaft, a flywheel journaled on said shaft, means fixedly carried by said flywheel on its inner peripheral surface adjacent said shaft and fixedly carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys sequentially to lock said flywheel teeth therebetween.

15. A clutch comprising a shaft, a flywheel journaled on said shaft, means fixedly carried by said flywheel on its inner peripheral surface adjacent said shaft and fixedly carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys sequentially to lock said flywheel teeth therebetween, one of said keys depending upon the locking engagement of another of said keys with said flywheel teeth before said one key can move into engagement therewith.

16. A clutch comprising a shaft, a flywheel journaled on said shaft, means fixedly carried by said flywheel on its inner peripheral surface adjacent said shaft and fixedly carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys sequentially to lock said flywheel teeth therebetween, one of said keys being carried by another of said keys to prevent said one key from moving into engaging position with said flywheel teeth before said other key.

17. A clutch comprising a shaft, a flywheel journaled on said shaft, means fixedly carried by said flywheel on its inner peripheral surface adjacent said shaft and fixedly carrying longitudinally and peripherally spaced teeth, a plurality of longitudinally slidable keys slidably mounted in said shaft, said keys carrying teeth which are adapted to engage opposite sides of said teeth carried by said flywheel, and spring-loaded means for actuating said keys to substantially simultaneously unlock them from said teeth carried by said flywheel.

18. A clutch comprising a shaft, a flywheel journaled on said shaft, means fixedly carried by said flywheel on its inner peripheral surface adjacent said shaft and fixedly carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys to substantially simultaneously unlock them from said teeth carried by said flywheel, one of said keys being carried out of locking engagement by another of said keys.

19. A clutch comprising a shaft, a flywheel journaled on said shaft, means fixedly carried by said flywheel on its inner peripheral surface adjacent said shaft and fixedly carrying longitudinally and peripherally spaced teeth, a longitudinally slidable driving key slidably mounted in said shaft, a longitudinally slidable locking key slidably mounted in said shaft, said keys carrying teeth which are adapted to engage said flywheel teeth, and means for actuating said keys to bring their teeth into engagement with said flywheel teeth to fixedly position said flywheel with respect said driven shaft.

20. A clutch comprising a shaft, a flywheel journaled on said shaft, means fixedly carried by said flywheel on its inner peripheral surface adjacent said shaft and fixedly carrying longitudinally and peripherally spaced teeth, a longitudinally slidable driving key slidably mounted in said shaft, a longitudinally slidable locking key slidably mounted in said shaft and parallel to said driving key, said keys carrying teeth which are adapted to engage said flywheel teeth, and means for actuating said keys to bring their teeth into engagement with said flywheel teeth to fixedly position said flywheel with respect said driven shaft.

21. A clutch comprising a shaft, a flywheel journaled on said shaft, means fixedly carried by said flywheel on its inner peripheral surface adjacent said shaft and fixedly carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys to substantially simultaneously unlock them from said teeth carried by said flywheel, one of said keys being carried out of locking engagement by another of said keys, said keys being individually movable within said shaft but having means interlocking the movement of the locking key with the driving key to prevent the locking key from engaging the teeth thereof with the flywheel teeth prior to the engagement of the teeth of the driving key.

22. A clutch comprising a shaft, a flywheel journaled on said shaft carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys sequentially to lock said flywheel teeth therebetween.

23. A clutch comprising a shaft, a flywheel journaled on said shaft carrying longitudinally and peripherally spaced teeth, a plurality of longitudinally slidable keys slidably mounted in said shaft, said keys carrying teeth which are adapted to engage opposite sides of said teeth carried by said flywheel, and means for actuating said keys sequentially to lock said flywheel teeth therebetween, one of said keys depending upon the locking engagement of another of said keys with said flywheel teeth before said one key can move into engagement therewith.

REUBEN E. WISSMAN.